Figure 1:
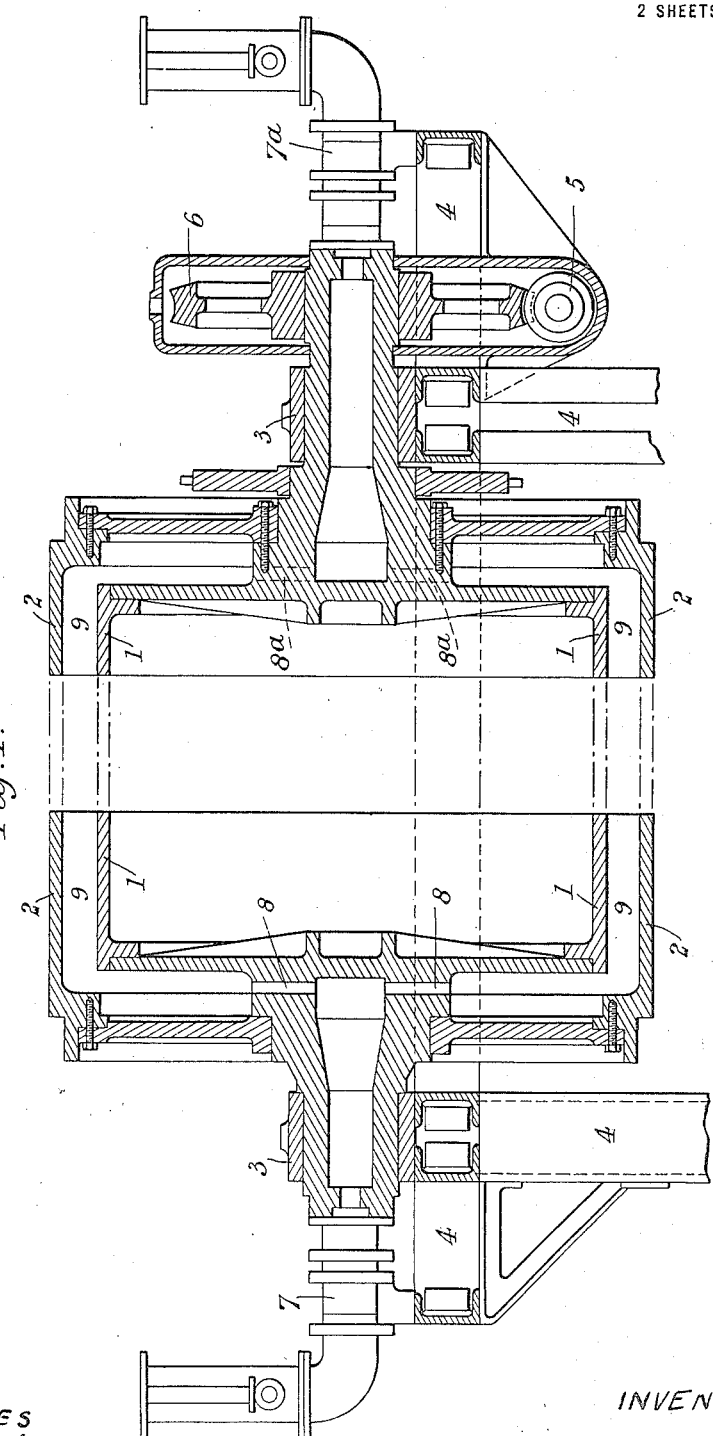

UNITED STATES PATENT OFFICE.

HERMANN GUSTAV ROBERT NAUMANN, OF UBBERGEN, NIJMEGEN, NETHERLANDS, ASSIGNOR TO ANT. JURGENS VEREENIGDE FABRIEKEN, OF OSS, NETHERLANDS.

APPARATUS FOR COOLING HOT OR MOLTEN FATS AND FATTY EMULSIONS AND THE LIKE.

1,163,439.  Specification of Letters Patent.  Patented Dec. 7, 1915.

Application filed February 24, 1915. Serial No. 10,363.

*To all whom it may concern:*

Be it known that I, HERMANN GUSTAV ROBERT NAUMANN, a subject of the King of Denmark, residing at Ubbergscheweg 65, Ubbergen, Nijmegen, Netherlands, have invented a new and useful Improved Apparatus for Cooling Hot or Molten Fats and Fatty Emulsions and the like, of which the following is a specification.

The cooling and solidifying of liquid, or semi-liquid, substance by taking it up by a rotating feeding cylinder, and applying it to a cooling-cylinder, and then removing it therefrom by scrapers, is known, and it has been proposed to spread such substance on cooling drums in a layer so thin that the crystallization of the solidifying fats takes place almost immediately, right through the whole layer. It has also been proposed to maintain the substance in a fluid state until it reaches the cooling-cylinder, and it has also been proposed to make the feeding cylinder adjustable to and from the cooling-cylinder.

This invention relates to apparatus of this class.

According to this invention the matter to be treated (which I will refer to as the fat) is first uniformly taken up upon the smooth periphery of a cylinder constituting a feeding surface which is maintained at the necessary temperature, preferably that of, or about that of, the matter to be cooled, and the said matter is thereby applied to the cooling surface, which is constituted by the smooth periphery of another cylinder. These two cylindrical surfaces are not in contact with each other but are so close together that the layer on the feeding surface comes into contact with the cooling surface, the said layer on the feeding surface being so regulated that it is a little thicker than the distance between the said two surfaces so that the fat at once adheres to the cooling surface, it being readily taken up thereby and spread evenly thereon by the feeding surface. The distance apart of the feeding and cooling cylinders is adjustable. The thickness of the layer thus applied to the cooling surface is such that the part of the layer next the cooling surface is at once crystallized and strongly cooled while the remainder of the layer is not fully cooled and is not crystallized, and the fat when scraped from the cooling surface, forms a mass in which the more cooled side of the layer comes against the less cooled side and a distribution of the cooling effect, or equalization of temperature, takes place throughout the mass. In cooling margarin emulsions for example this is effected usually in from four, to six, hours and then the cooled mass can be further treated in ordinary kneading machines in the usual way, without reheating being required. The conveyance of the layer from the feeding surface to the cooling surface is effected when both the cylinders are rotated preferably both in the same direction (*i. e.* as indicated by the arrows in the accompanying drawing) with the periphery of the feeding cylinder moving somewhat more quickly than does the periphery of the cooling cylinder, so that the layer of fat is applied by a spreading, or smoothing, action to the cooling surface, to which the layer properly adheres in consequence of the cooling effect thereof. Owing to the greater speed of the periphery of the feeding surface, the layer of fat which is spread on the cooling surface is somewhat thicker than is the layer taken up by the feeding surface. The quicker the feeding surface moves relatively to the cooling surface, the thicker will be the layer on the cooling surface, and therefore it is possible, by adjusting the relative speeds of the two surfaces, to obtain a most efficient thickness of the layer on the cooling surface.

Figure 2:
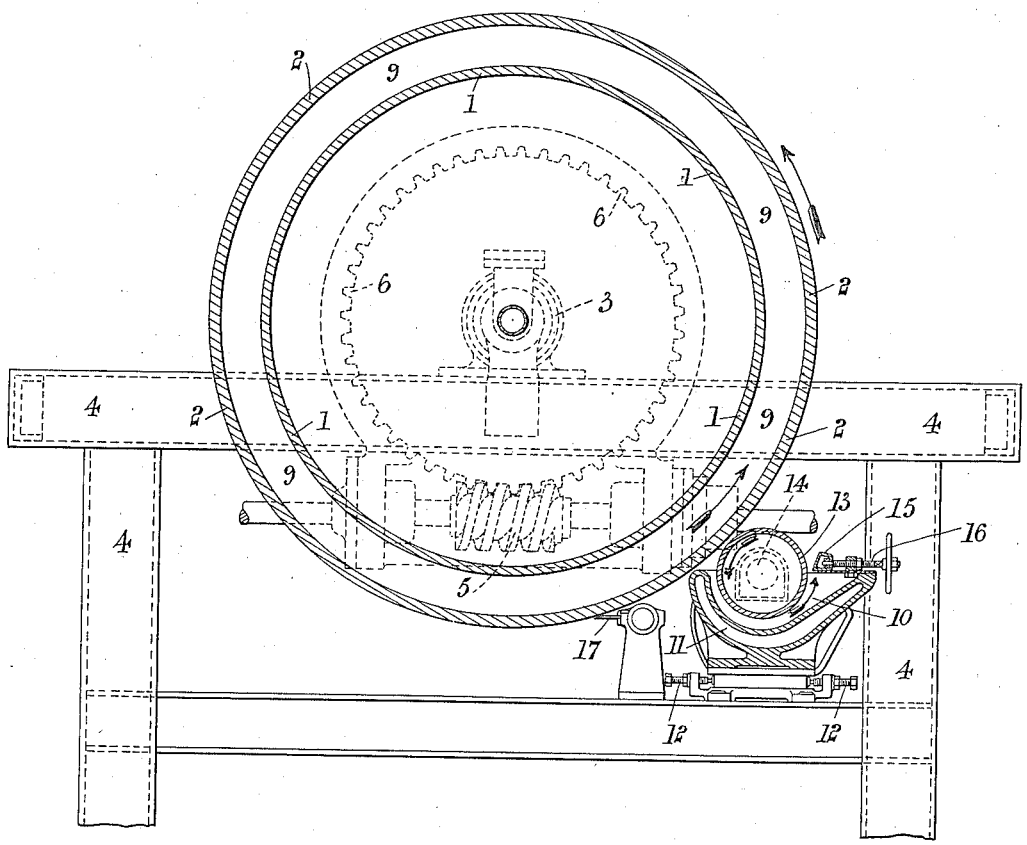

A device suitable for carrying out the process according to this invention is shown in the accompanying drawings, Figure 1 being a central longitudinal section and Fig. 2 a cross-section.

A cylinder 1, surrounded by a jacket 2, is mounted by trunnions in bearings 3, carried by a framing 4, and is driven by any suitable motor (not shown) by means, for example, of a worm 5 and worm wheel 6. A cooling medium enters at 7, through the trunnion at one end of this cylinder 1 and passes, by the openings 8, into the space 9 between the cylinder 1 and jacket 2 and leaves the said space at the other end of the cylinder 1 through similar passages marked 8ᵃ and 7ᵃ. At the side of the lower part of the cylinder 1 is a trough 10 capable of being brought to, and maintained at, the requisite temperature by passing an attemperating agent through its jacket 11. This trough is closed at its ends, and is secured to the bed-plate so that it can be adjusted toward and from the cylinder 1, by screws 12, and within this trough is rotatably mounted a small hollow feeding cylinder 13, which can be brought to the requisite temperature by passing an attemperating agent through it, the said cylinder 13, having hollow trunnions 14, mounted in bearings carried by the ends of the trough 10.

The cylinder 13, is near to the cooling cylinder 1, but is not in contact therewith, and the said cylinder 13, can be driven from the cylinder 1, by a belt, or other suitable gear, preferably such that the cylinder 13, is driven in the same direction as, (as indicated by the arrows) but at a greater speed than, the cylinder 1. On the side of the cylinder 13 opposite the cooling cylinder 1, is a doctor 15, which can be adjusted by screws 16, to regulate the thickness of the layer of fat on the feeding cylinder. Below the cylinder 1, and near to the trough 10, is arranged a scraper, or knife, 17, which is pressed against the periphery of the cylinder 1, by spring action, or the like.

The process is carried out with this apparatus as follows:—The liquid, or semi-liquid, fat is supplied to the trough 10, and is kept in brisk motion by the rotating surface of the cylinder 13, so that uniformity of temperature and mixture of the fat, emulsion, or the like, is maintained. Both the trough and the feeding cylinder are kept at, or about, the same temperature as the fat supplied to the trough so that the fat will be neither cooled, nor heated, till it reaches the cooling cylinder. As the cylinder 13, rotates in the fat in the trough 10, it becomes covered with a layer of the fat, which layer is kept of the required thickness by the doctor 15. Any excess of fat falls back into the trough 10, while the layer on the cylinder 13, is carried to the place where there is the least distance between the cylinders 1, and 13, and there it is received upon the cylinder 1, being spread thereon by the action of the cylinder 13. The cooling continues from the application of the layer to the cylinder 1, till the scraper 17, is reached, which scrapes off the cooled layer so that the layer remains in contact with the cylinder 1, during nearly a complete rotation thereof. The fat scraped off can be deposited in any suitable receptacle beneath the scraper 17. The cooling of the layer at the side in contact with the cylinder 1, is greater than at the other side and the fat scraped off is allowed to remain in the receptacle for from four, to six, hours, for the purpose of permitting equalization of the temperature throughout the mass, and the completion of the crystallization takes place during that time.

The cylinder 13, being rotated faster than the cylinder 1, causes the layer to be applied to the cylinder 1, by the cylinder 13, in a uniform and coherent manner without tearing, and the layers are very regular which is important especially, for instance, in cooling margarin emulsions, to insure uniform cooling and a good coherent constitution of the cooled mass.

The invention can be applied to cooling heated fats, fatty emulsions, and the like generally, such for instance as for cooling paraffin mixtures and similar bodies, which have to be brought to a solid, or semi-solid, state.

What I claim is:—

1. Apparatus for cooling hot, or molten, fats, fatty emulsions, and the like, the said apparatus comprising a feeding cylinder and a cooling cylinder, both with smooth peripheries in close, and adjustable, proximity to but not in contact with each other, means for rotating both the said cylinders, means for heating the feeding cylinder and means for insuring the feed by the latter of a regular and uniform layer of the matter to be cooled, to the periphery of the cooling cylinder, substantially as hereinbefore described.

2. Apparatus for cooling hot, or molten, fats, fatty emulsions, and the like, the said apparatus comprising a feeding cylinder and a cooling cylinder, both with smooth peripheries in close, and adjustable proximity to, but not in contact with each other, means for rotating both the said cylinders in the same direction but the feeding cylinder at a greater speed than the cooling cylinder, means for heating the feeding cylinder and means for insuring the feed by the latter of a regular and uniform layer of the matter to be cooled, to the periphery of the cooling cylinder, substantially as hereinbefore described.

3. Apparatus for cooling hot, or molten, fats, fatty emulsions, and the like, the said apparatus comprising a trough, a feeding cylinder thereon, and a cooling cylinder, both cylinders having smooth peripheries in close, and adjustable proximity to, but not in contact with each other, means for rotating both the said cylinders, means for heating the feeding cylinder and the trough and means whereby the matter to be cooled can be taken up upon the periphery of the feeding cylinder and a doctor for regulating and rendering uniform the layer taken up by the feeding cylinder and thence conveyed, and applied, to the periphery of the cooling cylinder, and properly spread thereon owing to the relative speeds of rotation of the said
5 cylinders, substantially as hereinbefore described.

In testimony whereof I have signed my name to this specification in the presence of two subscribing witnesses.

HERMANN GUSTAV ROBERT NAUMANN.

Witnesses:
    MARIUS DE LEENW,
    GEO. DARYN.